United States Patent
Fraser et al.

(10) Patent No.: US 9,468,249 B2
(45) Date of Patent: Oct. 18, 2016

(54) PROTECTIVE HEADGEAR (71) Applicants: Janice Geraldine Fraser, Belleville, IL (US); Robert B. Reeser, III, Belleville, IL (US)

(72) Inventors: Janice Geraldine Fraser, Belleville, IL (US); Robert B. Reeser, III, Belleville, IL (US)

(*) Notice: Subject to any disclaimer, the term of this patent is extended or adjusted under 35 U.S.C. 154(b) by 0 days.

(21) Appl. No.: 14/177,977

(22) Filed: Feb. 11, 2014

(65) Prior Publication Data
US 2015/0223545 A1 Aug. 13, 2015

(51) Int. Cl.
*A42B 3/12* (2006.01)
*B29C 69/00* (2006.01)

(52) U.S. Cl.
CPC .............. *A42B 3/121* (2013.01); *B29C 69/00* (2013.01)

(58) Field of Classification Search
CPC ...... A42B 3/121; A42B 3/122; A42B 3/125; A42B 3/04
USPC ............................................................. 2/413
See application file for complete search history.

(56) References Cited

U.S. PATENT DOCUMENTS

| | | | | |
|---|---|---|---|---|
| 2,418,069 | A * | 3/1947 | Delano | 2/7 |
| 2,768,919 | A * | 10/1956 | Bjorksten et al. | 428/51 |
| 3,600,714 | A | 8/1971 | Cade et al. | |
| 3,872,511 | A * | 3/1975 | Nichols | 2/413 |
| 3,999,220 | A * | 12/1976 | Keltner | 2/413 |
| 4,354,284 | A * | 10/1982 | Gooding | 2/413 |
| 4,375,108 | A * | 3/1983 | Gooding | 2/413 |
| 4,484,364 | A * | 11/1984 | Mitchell et al. | 2/413 |
| 4,547,919 | A * | 10/1985 | Wang | 428/116 |
| 5,003,631 | A * | 4/1991 | Richardson | 2/6.1 |
| 5,095,545 | A * | 3/1992 | Lane | 2/68 |
| 5,129,107 | A * | 7/1992 | Lorenzo | 2/413 |
| 5,556,169 | A * | 9/1996 | Parrish et al. | 297/452.28 |
| 6,421,840 | B1 | 7/2002 | Chen et al. | |
| 7,603,725 | B2 | 10/2009 | Harris | |
| 8,127,373 | B1 | 3/2012 | Fodemski | |
| 8,844,066 | B1 * | 9/2014 | Whitcomb | 2/413 |
| 2004/0045090 | A1 * | 3/2004 | Tsai | 5/709 |
| 2004/0238988 | A1 | 12/2004 | Fraser | |
| 2007/0190293 | A1 * | 8/2007 | Ferrara | 428/166 |
| 2008/0155735 | A1 * | 7/2008 | Ferrara | 2/412 |
| 2008/0256686 | A1 * | 10/2008 | Ferrara | 2/413 |
| 2010/0186150 | A1 | 7/2010 | Ferrara et al. | |
| 2011/0252544 | A1 * | 10/2011 | Abernethy | 2/413 |

(Continued)

OTHER PUBLICATIONS

An International Search Report and Written Opinion, dated May 15, 2015, for co-pending International application No. PCT/US2015/015463 (11 pgs).

*Primary Examiner* — Shaun R Hurley
*Assistant Examiner* — Bao-Thieu L Nguyen
(74) *Attorney, Agent, or Firm* — Armstrong Teasdale LLP (57) ABSTRACT

A helmet including a shell and a support system is provided. The shell includes an outer surface and an inner surface. The support system includes a base and a plurality of hollow cells extending outward from the base. The support system substantially conforms to the shell inner surface. The cells are segmented into a plurality of regions wherein the cells within each of the regions are coupled together in flow communication via a plurality of channels extending therebetween. At least one cell within a first region is coupled in flow communication to at least one cell within a second region to enable fluid to be selectively transferred from at least some of the cells in the first region to at least some of the cells in the second region to facilitate reducing an amount of energy induced to a wearer of the helmet following an impact to the shell.

20 Claims, 6 Drawing Sheets

(56) References Cited

U.S. PATENT DOCUMENTS

| | | |
|---|---|---|
| 2011/0296594 A1 | 12/2011 | Thomas et al. |
| 2013/0174331 A1* | 7/2013 | Witcher ............................ 2/413 |
| 2013/0232668 A1* | 9/2013 | Suddaby ........................... 2/413 |
| 2014/0020158 A1* | 1/2014 | Parsons et al. ................... 2/413 |
| 2014/0068841 A1* | 3/2014 | Brown .............................. 2/413 |
| 2014/0123371 A1* | 5/2014 | Witcher ............................ 2/413 |
| 2014/0138196 A1* | 5/2014 | Mazzucchelli ............... 188/268 |
| 2014/0201890 A1* | 7/2014 | Kelly et al. ....................... 2/413 |

* cited by examiner

PROTECTIVE HEADGEAR

BACKGROUND

This invention relates generally to protective headgear, and more particularly, to headgear designed to facilitate reducing skull and brain injuries.

Modern headgear, including helmets, is often worn by individuals during physical activities, including sporting events and exercise, to help protect the wearer from head injuries. At least some known head protective devices are manufactured to satisfy safety and/or legal regulations set by various federal and state agencies, and/or organizations governing specific activities. For example, military helmets may be manufactured to withstand different requirements than those required by professional sports organizations, such as Major League Baseball (MLB) or the National Football League (NFL). Generally, the efficacy of all protective headgear is constantly examined to facilitate enhanced head protection for the wearer. Moreover, because brain damage is cumulative and is permanent, no corrective measure can undo damage resulting from a brain injury and as such, the focus of preventing such injuries from occurring has been elevated.

Generally, protective headgear is designed to satisfy specific requirements relating to inter alia the maximum acceleration that may occur in the center of the wearer's brain at a specified load, and/or to withstand the maximum impact that the wearer's head may be exposed to during a specific activity. Typically, during testing of at least some known protective headgear, a dummy skull equipped with a protective headgear, such as a helmet, is subjected to a radial impact. More specifically, if the wearer's head is not in motion when impacted by an object, generally the impact creates a linear acceleration and a point load (i.e., a force concentrated over a small area). Such an impact may result in a skull fracture and/or mild traumatic brain injury (MTBI). More specifically, the severity of injury to the wearer may vary depending on several factors, including the magnitude and direction of the impact. When an external impact shakes the brain inside the skull, the shaking may result in temporarily disrupting the brain from working normally by disturbing or damaging electrical, chemical, and/or anatomical function connections within the brain, which may result in MTBI.

At least some known protective headgear attempt to absorb as much of the energy transmitted by radial impact with another object, including equipment worn or used by another person, a body part of another person, the ground, and/or a structural object, and/or attempt to deflect impacts occurring at an oblique angle to the helmet. Moreover, at least some known protective headgear is designed to reduce brain concussions to the wearer. To reduce the effect of an external impact to the wearer, at least some known helmets include at least a hard outer shell, often fabricated from a plastic or a composite material, and an energy absorbing layer called a liner. Some known helmets also include an internal head-fitting structure such as a suspension webbing, a foam layer, fluid-filled bladders, and/or a padding molded to fit a specific wearer. The hard exterior plastic shells of known helmets and the interior form-fitting structures have the ability to absorb a certain amount of the impact energy induced to the wearer when the helmet is impacted by an object. Any impact energy not absorbed by the helmet is transferred to the skull of the wearer, which may result in injuries ranging from mild concussions or mild traumatic brain injury (MTBI) to severe brain damage. Helmets fabricated as such, provide some impact-absorption capacity to the wearer for impacts that are primarily radially-directed, but typically such helmets generally provide far less energy absorption for impacts induced non-radially to the helmet.

Other known helmets may include impact-absorbing compression members that compress when subjected to an impact. For example, at least some of such helmets include cells that are compressible when the helmet is pressed against the wearer's head when subjected to impact forces. At least some of the known compression cells may be filled with a resilient material, such as foam. However, depending on the size and density of the resilient material, such cells may be prone to bottoming out when compressed between the helmet and the wearer's head. Once bottomed out, the energy absorption ability of such cells is limited at best. Simply increasing the density of the compressible material and/or increasing the thickness of the cells may provide only limited benefits and may require significant increases in the overall size of the helmet. Other known compression cells are fabricated from materials that are more resilient than foam and that return to their original shape after being compressed. Generally such compression cells are hollow and expel air as they are compressed between the helmet and the wearer's head. As such, depending on the size and placement of the cells in the area of an impact to the helmet, only one or a limited amount of cells may be compressed, such that a point load, of lesser magnitude than the original impact, may still be induced to the wearer over a relatively small concentrated area. As such, the energy-absorption capabilities and benefits of known helmets including such compression cells may be limited.

BRIEF DESCRIPTION

In one aspect, a helmet is provided. The helmet includes a shell and a support system. The shell includes an outer surface and an inner surface. The support system includes a base and a plurality of hollow cells extending outward from the base. The support system is flexible and substantially conforms to the shell inner surface. The plurality of cells are segmented into a plurality of regions wherein the plurality of cells within each of the regions are coupled together in flow communication via a plurality of channels extending between the cells. At least one of the cells within a first of the plurality of regions is coupled in flow communication to at least one cell within a second of the plurality of regions to enable fluid to be selectively transferred from at least some of the cells in the first region to at least some of the cells in the second region to facilitate reducing an amount of energy induced to a wearer of the helmet following an impact to the shell.

In another aspect, a helmet is provided that includes a shell and a support system. The shell includes an outer surface and an inner surface. The support system includes a base and a plurality of hollow cells extending outward from the base. The base includes an outer surface and an inner surface. The support system is flexible and substantially conforms to the shell inner surface. The plurality of cells are segmented into a plurality of regions, wherein cells within each of the respective regions are coupled together in flow communication via a plurality of channels extending there between. The plurality of cells within at least a first and a second of the plurality of regions extend outward from the base outer surface and are between the shell inner surface and the base outer surface. At least a first cell in the first plurality of regions is coupled in flow communication to at least one cell in the second plurality of regions for selectively transferring fluid there between. The plurality of cells within at least a third of the plurality of regions extend outward from the base inner surface. At least a first of the plurality of cells in the first plurality of regions is coupled to a flow control device configured to selectively control flow independently to and from at least some cells in the third plurality of regions.

In a further aspect, a support system for use in dissipating energy induced to a protective structure is provided. The support system includes a base, a first plurality of cells, and a second plurality of cells. The base includes a first surface and an opposite second surface, and is flexible. The first plurality of hollow cells extend from the base first surface such that each of the first plurality of cells are coupled together in flow communication with each other. The first plurality of cells each extend outward from the base first surface. The second plurality of hollow cells extend outward from the base second surface such that each of the second plurality of cells are coupled together in flow communication with each other. The second plurality of cells each extend outward from the base second surface. The first plurality of cells are between the base first surface and the protective structure. At least a first of the first plurality of cells is coupled in flow communication to a flow control device configured to selectively control flow independently into and from at least one of the cells within the second plurality of cells to facilitate dissipating energy produced following an impact to protective structure.

DETAILED DESCRIPTION

Embodiments of the present disclosure relate to energy-absorption/dissipation systems implemented within various devices, components, systems, and processes to facilitate energy dissipation. In some embodiments, an energy-absorption system is implemented within support structures such as, but not limited to protective headgear, helmets, shoes, or other protective wear/clothing including baseball chest protectors, shin guards, and/or shoulder pads. In other implementations, the energy-absorption system is implemented in structures designed to absorb an impact, such as, but not limited to, crash barriers. As used herein, the term energy absorption system refers to systems that distribute energy from an impact over a larger area to facilitate dissipating the energy and to facilitate reducing impact loading induced to the wearer is substantially reduced. The embodiments described herein are exemplary and are not limited to the descriptions provided.

Figure 1:
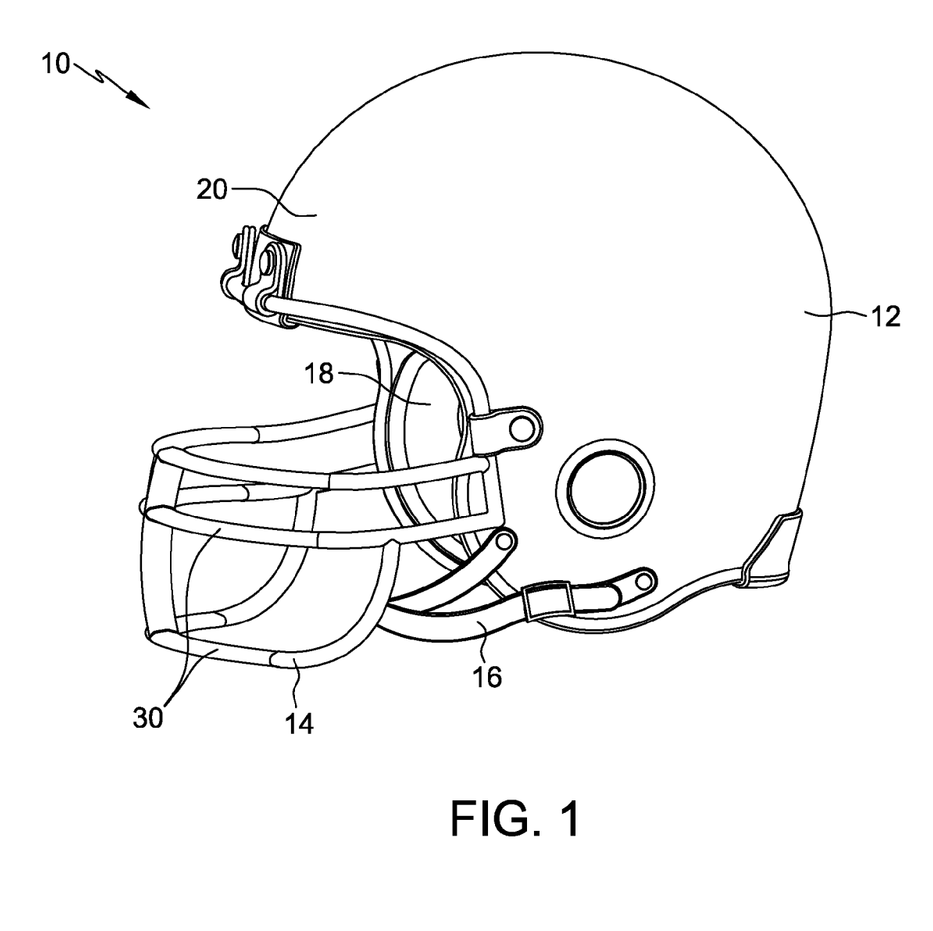
FIG. 1 is a perspective view of an exemplary football helmet.

FIG. 1 is a perspective view of an exemplary helmet 10 that may include an energy-absorption system (not shown in FIG. 1). More specifically, in the exemplary embodiment, helmet 10 is a football helmet that includes a shell 12, a facemask 14 coupled to shell 12, and a chin strap 16 that is selectively adjustable to facilitate securing helmet 10 to the head of a wearer.

In the exemplary embodiment, shell 12 is hardened and includes an inner surface 18 and an opposite outer surface 20. Shell 12 is fabricated from a material that has properties that enable shell 12 to substantially resist tears and abrasion due to impacts with objects. Moreover, in the exemplary embodiment, shell outer surface 20 has a low coefficient of friction. In some embodiments, shell 12 is fabricated from a polymer material, such as, but not limited to polycarbonate, Acrylonitrile butadiene styrene (ABS), polyvinyl chloride (PVC), glassfiber, Aramid, TWARON®, carbonfibre, or KEVLAR®. In an alternative embodiment, helmet 10 may include a thin layer (not shown) extending across inner surface 18 that has physical characteristics that enable it to absorb some of the energy induced to helmet 10 as a result of an impact to helmet 10. For example, such a layer may be fabricated from a polymer foam material such as EPS (expanded poly styrene), EPP (expanded polypropylene), EPU (expanded polyurethane) or other structures like honeycomb for example.

In the exemplary embodiment, facemask 14 includes a plurality of bars 30 that are each fabricated from resin-impregnated carbon fibers wrapped in KEVLAR®. Alternatively, facemask 14 may be fabricated from any material that enables facemask 14 to work in cooperation with shell 12 to facilitate absorbing at least some of the energy that impacts with it. In addition, facemask 14 and/or shell 12 may include other features, such as, but not limited to, vents.

Figure 2:
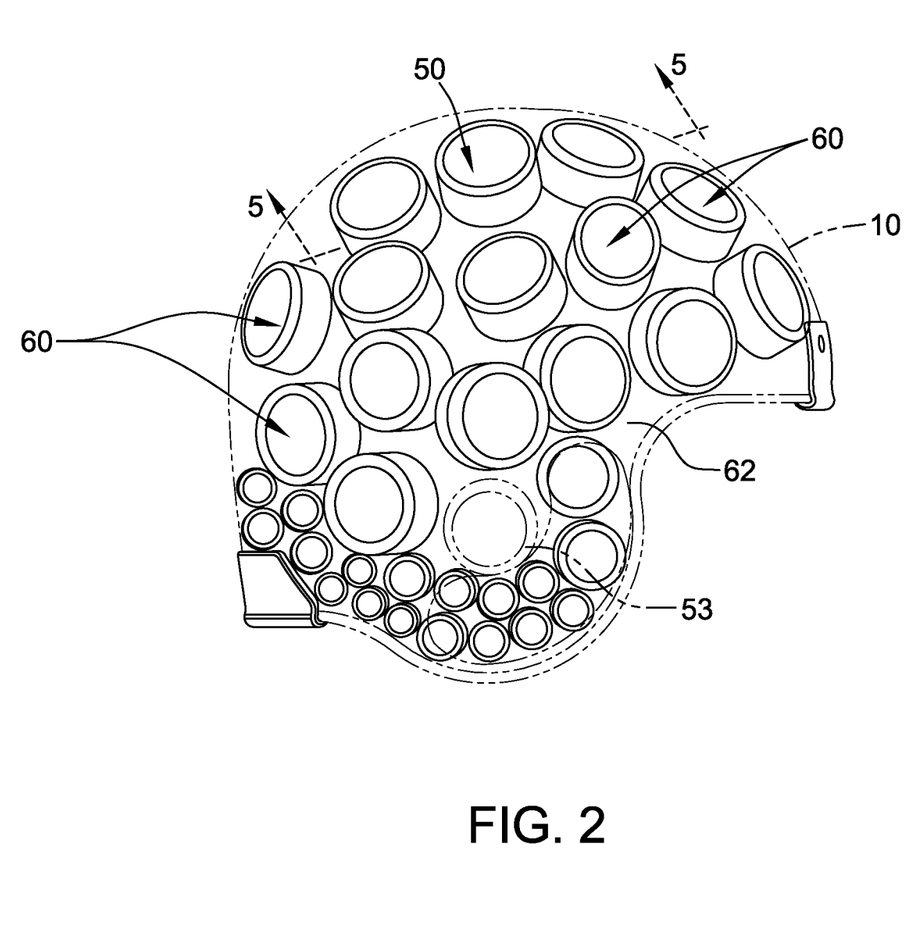
FIG. 2 is a partially-broken away side view of an exemplary energy-absorption system coupled to a helmet, such as the helmet shown in FIG. 1.
Figure 3:
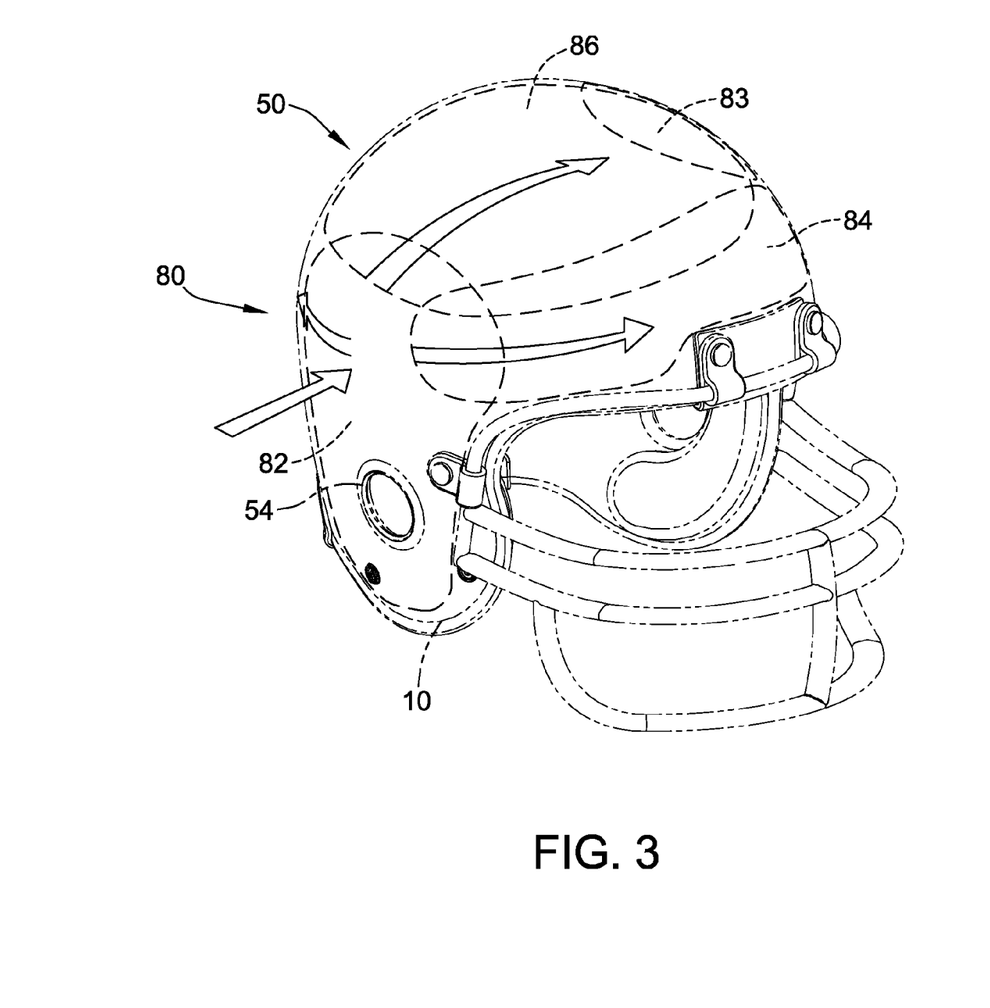
FIG. 3 is a schematic view of the energy-absorption system shown in FIG. 2.
Figure 4:
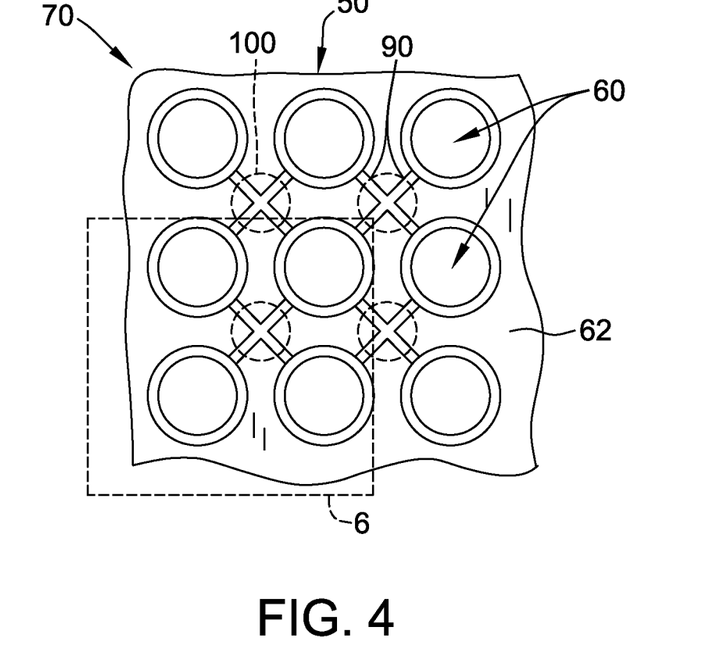
FIG. 4 is a cross sectional view of a portion of the energy-absorption system shown in FIG. 2.
Figure 5:
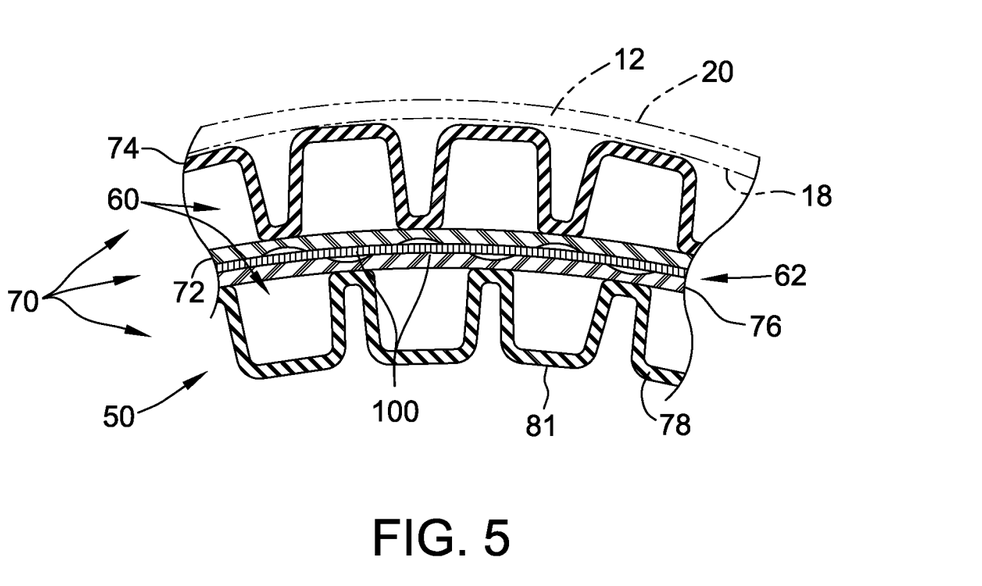
FIG. 5 is an enlarged plan cross-sectional schematic view of a portion of the energy-absorption system shown in FIG. 2 and taken along line 5-5.
Figure 6:
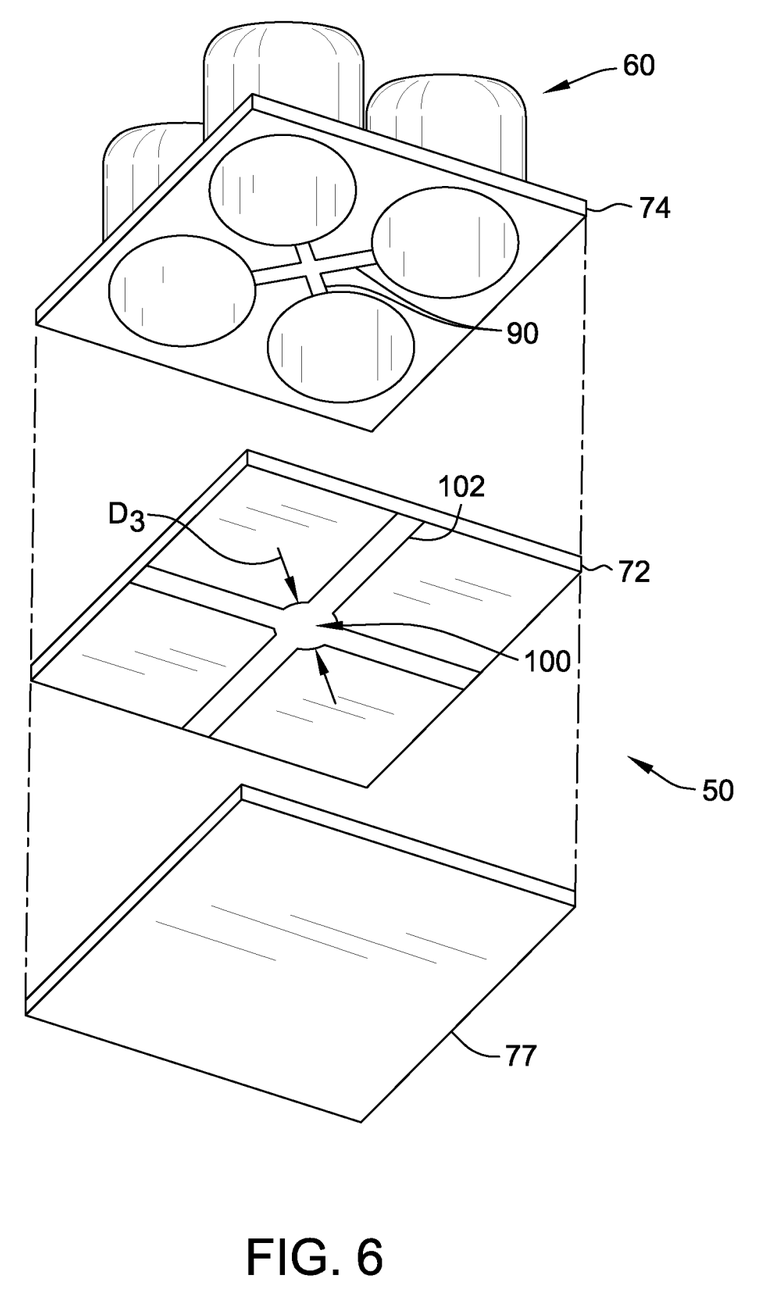
FIG. 6 is an enlarged perspective cross-sectional view of a portion of the energy absorption system shown in FIG. 5 and taken along line 6-6.

FIG. 2 is a partially-broken away side view of an exemplary energy-absorption system 50 coupled within helmet 10. FIG. 3 is a schematic view of energy-absorption system 50. FIG. 4 is a cross sectional schematic plan view of a portion of energy-absorption system 50 and FIG. 5 is an enlarged cross-sectional schematic view of a portion of energy-absorption system 50 as taken along line 5-5. FIG. 6 is an enlarged perspective cross-sectional view of a portion of energy-absorption system 50 taken along area 6-6. Although the present disclosure is illustrated in the context of sports equipment, and more particularly, football helmet 10, it should be appreciated that numerous helmet types can utilize energy-absorption system 50, and that helmet 10 is merely exemplary. For example, energy-absorption system 50 may be used with, but is not limited to being used with, military helmets, lacrosse helmets, batting helmets, hockey helmets, bicycle helmets, motorcycle helmets, construction/safety hard hats, headgear for rock or mountain climbing and/or headgear for boxers. Moreover, energy-absorption system 50 may be incorporated into crash barriers, outfield walls, wrestling mats, gymnastic mats, infant car seats, and/or sports equipment such as shin guards or chest protectors.

In the exemplary embodiment, system 50 is coupled within helmet 10 and is contoured to compliment helmet inner surface 18. As such, in the exemplary embodiment, during use, system 50 is flexible and, as described in more detail below, substantially mates against, and/or is positioned in close proximity to, helmet inner surface 18 within helmet 50. More specifically, in the exemplary embodiment, energy-absorption system 50 is sized and shaped to extend across substantially all of helmet inner surface 18.

System 50 includes a base 62 and a plurality of hollow cells 60. Cells 60 extend outward from base 62 and as described in more detail below, may be oriented in any arrangement or orientation relative to base 62 that enables system 50 to function as described herein. Because system 50 extends across substantially all of helmet inner surface 18, system 50 may include cut-outs or openings 53 that substantially correspond to openings 54 and/or vents formed in helmet 10.

In each embodiment, system 50 includes a plurality of hollow cells 60 that extend outwardly from base 62. In the exemplary embodiment, base 62 is sized to enable cells 60 to extend across substantially all of helmet inner surface 18. Base 62 is flexible and is formed from a plurality of layers 70 that are coupled together. In one embodiment, base 62 and cells 60 are formed from a flexible neoprene material. Alternatively, base 62 and cells 60 may be formed from any non-neoprene material that enables system 50 to function as described herein. In the exemplary embodiment, an outer layer 72 is coupled to an outer conformal layer 74, and an inner layer 76 is coupled to an inner conformal layer 78. Moreover, in the exemplary embodiment, outer layer 72 is coupled against inner layer 76 such that layers 72 and 76 extend between conformal layers 74 and 78, as described in more detail below. In one embodiment, at least a portion of one layer 72, 74, 76, and/or 78, is fabricated from a material that prevents that specific layer 72, 74, 76, and/or 78, or portion of that layer 72, 74, 76, and/or 78, from bonding against the other layers 70. In an alternative embodiment, base 62 includes more than four layers 70. In another alternative embodiment, base 62 only includes only one conformal layer 74 or 78, and/or may include only inner layer 76 or outer layer 72. Layers 72, 74, 76, and/or 78 may be coupled together in any orientation that enables system 50 to function as described herein. For example, in one embodiment, layer 72 is positioned adjacent to helmet inner surface 18 and layer 74 is adjacent to layer 76.

In the exemplary embodiment, each conformal layer 74 and 78 is formed unitarily with cells 60, such that cells 60 extending from each specific layer 72 or 76 are only coupled in fluid flow communication with cells 60 extending from that specific layer 72 or 76 and are not coupled in flow communication with cells 60 extending from the other layer 76 or 72, as is described in more detail below. Moreover, in the exemplary embodiment, not all cells 60 extending from each layer 72 or 76 are coupled together in fluid flow communication, but rather, each specific layer 72 and 76 is defined into impact cell regions 80 that include cells 60 that are coupled together in fluid flow communication with each other, and different impact regions 80 are coupled together in flow communication, as described in more detail below. More specifically, in the exemplary embodiment, cells 60 are oriented substantially symmetrically across each conformal layer 74 and 78, relative to helmet 10. It should be noted that within cell regions 80, adjacent cells 60 are separated by a distance $D_1$ that may vary depending on the orientation of cells 60 relative to helmet 10. In an alternative embodiment, cells 60 may be coupled together in any arrangement and/or orientation with respect to each other that enables system 50 to function as described herein.

In the exemplary embodiment, each conformal layer 74 and 78 is molded with, and is thus formed integrally, with cells 60 extending from that respective layer 74 or 78. In an alternative embodiment, cells 60 may be coupled to layer 74 or 78, using any suitable coupling means including gluing and/or RF welding. In another alternative embodiment, cells 60 are formed integrally with layer 72 or 76 using an injection molding process. In the exemplary embodiment, cells 62 are all substantially identical and each has generally the same height H. Moreover, because each cell 60 in the exemplary embodiment is substantially circular, each has substantially the same diameter $D_2$. Alternatively, a plurality of different-sized and/or different-shaped cells 60 may extend from 72 and/or 76. For example, in some embodiments, at least some cells 60 are contoured at their outer ends 81.

Moreover, in the exemplary embodiment, the shape, size, and orientation of each cell 60 with respect to either layer 74 and/or 78, as well as the material and thickness of conformal layers 74 and 78 are variably selected to facilitate each cell 60 controllably buckling when subjected to an impact, to facilitate optimal fluid transfer between cells 60, as described in more detail below, and to ensure that each cell 60 quickly returns to its original shape after being subjected to an impact. In addition, the location and number of cells 60, as well as the fluid pressure in cells 60 are also variably selected to facilitate system 50 functioning as described herein, and more specifically to facilitate optimizing the response of cells 60 to a wide range of impact loads, regardless of the angle of the impact relative to each cell 60.

In the exemplary embodiment, system 50 is divided into impact regions 80 that are spaced across substantially all of inner surface 18. Specifically, in the exemplary embodiment, regions 80 are generally symmetrically aligned with respect to helmet 10 and include a pair of side regions 82 and 83, a front region 84, a rear region (not shown), and an upper region 86. Regions 80 are not distinct and/or independent from each other, but rather regions 80 overlap in the exemplary embodiment. In alternative embodiments, system 50 may include more or less regions than are illustrated in FIG. 3. Moreover, the relative locations of regions 80 are variably selected to facilitate optimizing energy absorption by system 50 as described herein. At least some cells 60 within different regions 80 are coupled together in flow communication as described in more detail below. Furthermore, in the exemplary embodiment, cells 60 in conformal layers 74 and 78 are divided into the same impact regions 80. Alternatively, conformal layer 74 may be divided into different impact regions 80 than conformal layer 78.

A plurality of channels 90 extend between adjacent cells 60 within each region 80. Channels 90 may extend between any number of cells 60 that facilitates system 50 functioning as described herein. More specifically, in the exemplary embodiment, within each region 80, at least some channels 90 are arranged generally in flowpaths that extend across system to couple cells 60 together. In at least a portion of the exemplary embodiment, channels 90 are arranged in generally X-shaped patterns that couple four adjacent cells 60 together in flow communication. Channels 90 may extend between any number of cells 60 (i.e., at least two) and may extend in any orientation that enables system 50 to perform as described herein.

Channels 90 are coupled in sealing contact with each respective conformal layer 74 and/or 78. In one embodiment, channels 90 are coupled to each conformal layer 74 and/or 78 using a silk-screening process. In another embodiment, channels 90 are formed integrally with each conformal layer 74 or 78. In a further embodiment, channels 90 are coupled to each layer 74 or 78 using an X-Y printing machine process. In yet another embodiment, channels 90 are coupled to layers 74 or 78 using an adhesive process. In a further embodiment, channels 90 are formed using a liquid gasket process. In another embodiment, channels 90 are formed using a spray process. In a further embodiment, channels 90 are coupled to each conformal layer 74 or 78 using any process that enables channels 90 to couple to a layer 74 or 78 such that adjacent cells 60 are coupled together in flow communication. For example, in one alternative embodiment, flow tubes are coupled to a layer 62 to form channels 90.

In one embodiment, a release agent is contained within each channel 90. The release agent facilitates ensuring that channels 90 remain substantially unobstructed during the assembly of system 50, such that adjacent cells 60 coupled together via channels 90 remain in fluid flow communication. More specifically, and as described in more detail below, in such an embodiment, during assembly of system 60, the release agent ensures that adjacent system layers 72 and 74, and/or layers 76 and 78 remain separated to define channels 90. In the exemplary embodiment, the release agent is formed from a low viscous solution. In another embodiment, the release agent is any solution that performs as described herein, and more specifically, prevents the bonding together of the layers 72 with 74, and 76 with 78, such as, but not limited to, petroleum-based mixtures.

In the exemplary embodiment, each layer 72 and 76 is approximately the same cross-sectional size and shape as each respective conformal layer 74 and 78 as defined by an outer perimeter of each conformal layer 74 and 78. Alternatively, layers 72 and 76 may be sized differently, and/or may have different cross-sectional shapes. In the exemplary embodiment, each layer 72 and 76 defines a plurality of fluid control devices 100. In the exemplary embodiment, fluid control devices 100 are known as lock pockets. Lock pockets 100, in the exemplary embodiment, are not all coupled together in fluid flow communication, but rather, lock pockets 100 are oriented and coupled together relative to regions 80 to facilitate operation of system 50 as described herein. More specifically, lock pockets 100 are coupled together by a plurality of lock pocket channels 102. In the exemplary embodiment, lock pockets 100 are each substantially circular and each has a diameter $D_3$ that is less than a length $L_1$ of each respective channel 90 that each lock pocket 100 is positioned against as described herein. In an alternative embodiment, lock pockets 100 may have different shapes on each layer 72 and 76, or those defined by layer 72 may have a different shape than those defined by layer 76. Moreover, in another embodiment, lock pockets 100 are non-circular. As described herein, varying the volume and location of lock pockets 100, relative to layers 72 and/or 76 facilitates controlling fluid flow and optimizing energy transfer and dissipation. Alternatively, channels 102 may be sized differently and/or may have varying or different cross-sectionals shapes and/or may include throats defined therein.

In another alternative embodiment, system 50 does not include lock pockets 100, but rather includes a plurality of other fluid control mechanisms, such as check valves, that operate to control flow communication similarly to the lock pockets 100 described herein. In a further alternative embodiment, system 50 includes at least one fluid control mechanism in addition to at least one lock pocket 100. For example, such fluid control devices may include, but are not limited to only including, mechanical devices, electro-mechanical devices, pneumatic devices, hydraulic devices, electrical devices, or magnetic devices. Moreover, in other embodiments, system 50 includes in the alternative to lock pockets 100, and/or in addition to lock pockets 100, fluid control devices such as converging/diverging throats, venturis, and/or other flow restriction/control devices formed in channels 90. Furthermore, in some embodiments, a plurality of cells 60 are coupled in flow communication to a header, a bladder, or a manifold that is used to facilitate flow control, and in such embodiments, lock pockets 100 may be positioned to control flow into or from the manifold.

Each lock pocket 100 is positioned substantially concentrically with respect to at least one channel 90 extending between a plurality of cells 60 when each layer 72 and 76 is coupled to a respective conformal layer 74 and 78. For example, in some locations within system 50, a lock pocket 100 is positioned substantially concentrically with respect to a pair of channels 90. Accordingly, in the exemplary embodiment, when layers 72 and 74, and layers 76 and 78 are coupled together, lock pocket channels 102 are substantially centered, and extend, between adjacent cells 60 and/or extend between cells 60 in different regions 80, such as cells 60 in side regions 82 and 83. Alternatively, lock pockets 100 may be positioned anywhere relative to channels 90 that enables lock pockets 100 and system 50 to perform as described herein.

In the exemplary embodiment, lock pockets 100 and lock pocket channels 102 are formed within each layer 72 and/or 76 by coupling polymers to each layer 72 and 76. In one embodiment, the polymers are coupled via a radio frequency (RF) welding process, wherein the polymers are positioned across each layer 72 and/or 76 in desired locations prior to each layer 72 and/or 76 being coupled to a respective conformal layer 74 and/or 78. In one embodiment, each layer 72 and/or 76 is coupled to a respective conformal layer 74 and 78 with a lamination process. Specifically, in the exemplary embodiment, prior to either layer 72 or 76 being coupled to a respective layer 74 and 78, an adhesive material is applied to layer 72 or 76 such that the adhesive material extends substantially across that layer 72 or 76 between lock pockets 100 and lock pocket channels 102.

When a layer 72 or 76 is coupled to a respective conformal layer 74 or 78, that specific layer 72 or 76 mates in sealing contact with areas of that conformal layer 74 or 78 that extend between adjacent cells 60, and around an outer perimeter of each hollow cell 60. More specifically, when layer 72 or 76 is coupled to layer 74 or 78, lock pockets 100 and lock pocket channels 102 are properly oriented relative to cells 14, and are defined against that conformal layer 74 or 78 and between an outer surface of each layer 72 and 76 and a lower surface of each conformal layer 74 and 78. The release agent prevents each layer 72 and 76 from sealing against a respective conformal layer 74 and 78 in areas defined by channels 90, such that, as described in more detail below, fluid flow between layers 72 and 74, and 76 and 78 is only possible through channels 90.

In an alternative embodiment, system 50 includes only one layer 72 or 76 and conformal layers 74 and 76 are coupled to the same base layer 72 or 76. In such an embodiment, lock pockets 100 may be defined between portions of each conformal layer 74 or 78 and the base layer 72 or 76, or may be formed using channels or flow passageways 90 that are coupled to the base layer 72 or 76, for example.

In each embodiment, lock pockets 100 and lock pocket channels 102 are arranged in a pre-determined or programmed pattern that is variably selected to meet a user's requirements and in a pattern or arrangement that facilitates optimizing flow control and energy transfer. More specially, the pattern of lock pockets 100 is selected to facilitate control of inflation and deflation of cells 100 when system 50 and more specifically, helmet 10 is subjected to an impact 130, and/or when system 50 is subjected to an impact from movement of the wearers head within helmet 10. Controlling the inflation and deflation of cells 60 facilitates transferring energy 130 induced to helmet 10 at the point of impact, by selectively transferring energy 132 via fluid flow through cells 60 and channels 90 until the energy induced to helmet 10 is dissipated. More specifically, and as is described in more detail below, when helmet 10 is subjected to an impact 130, the array of cells 60 enables the impact load 130 induced to helmet 10 to be distributed 132 across helmet 10 in a manner such that the force of the impact loading 130 is offset and is generally equalized by the exchange of fluid pressure transferred within cells 60. Generally, and as described in more detail herein, lock pockets 100 selectively control the inflation and deflation of at least some cells 60 in response to impact loading 130 to facilitate minimizing the biomechanical effects of a helmet impact to the brain of the user.

In the exemplary embodiment, as best seen with respect to FIG. 3, lock pockets 100 are oriented such that fluid flow communication via channels 90 between impact cell regions 80 is controlled when helmet 10 is subjected to an impact 130. The relative arrangement is variably selected, based on a plurality of factors, including, but not limited to the physical demands of the wearer, and to ensure that system 50 provides the user with varying degrees of control and comfort, without sacrificing helmet stability or safety to the user. Moreover, the relative size and location of lock pockets 100 and lock pocket channels 102 are variably selected to facilitate operation of system 50. For example, in the exemplary embodiment, to facilitate optimizing control of fluid transfer between different impact regions 80 and different cells 60, the size and location of lock pockets 100 used with cells 60 in layer 74 is different than the size and location of lock pockets 100 used with cells in layer 78.

Generally, cells 60 within each region 80 are coupled in flow communication to each other via channels 90. Moreover, in the exemplary embodiment, at least some individual cells 60 or groups of cells 60 in each region 80 are coupled in flow communication with cells 60 in an adjacent different region 80. For example, in the exemplary embodiment, at least some cells 60 in side region 82 are coupled in flow communication with cells 60 in adjacent impact regions 84 and 86, and the rear region. In addition, at least some cells in each region 80, other than region 86 which is coupled in flow communication to cells 60 in the rear region and in regions 82, 83, and 84, are coupled in flow communication with cells 60 located in diametrically opposite regions. For example, in the exemplary embodiment, cells 60 in region 82 are coupled in flow communication with cells in region 83, and/or cells in region 84 are coupled in flow communication with cells in the rear region. Furthermore, in the exemplary embodiment, as described in more detail below, at least some cells 60 in each region 80 are also coupled to lock pockets 100 used to control fluid flow to cells 60 in other regions 80.

Lock pockets 100 are positioned within predefined areas of system to selectively control flow communication from at least some cells 60 in regions 80 to at least some cells 60 in other regions 80. The orientation of cells 60, lock pockets 100, channels 90 and/or 102, and the relative orientation of impact cell regions 80 may be the same or different between the system outer portion (i.e., that portion of system 50 formed by layers 72 and 74) as compared to the inner portion (i.e., that of system 50 formed by layers 76 and 78). Any relative orientation of cells 60, lock pockets 100, channels 90 and/or 102, and cell regions 80 may be used that enables system 50 and helmet 10 to function as described herein.

Figure 7:
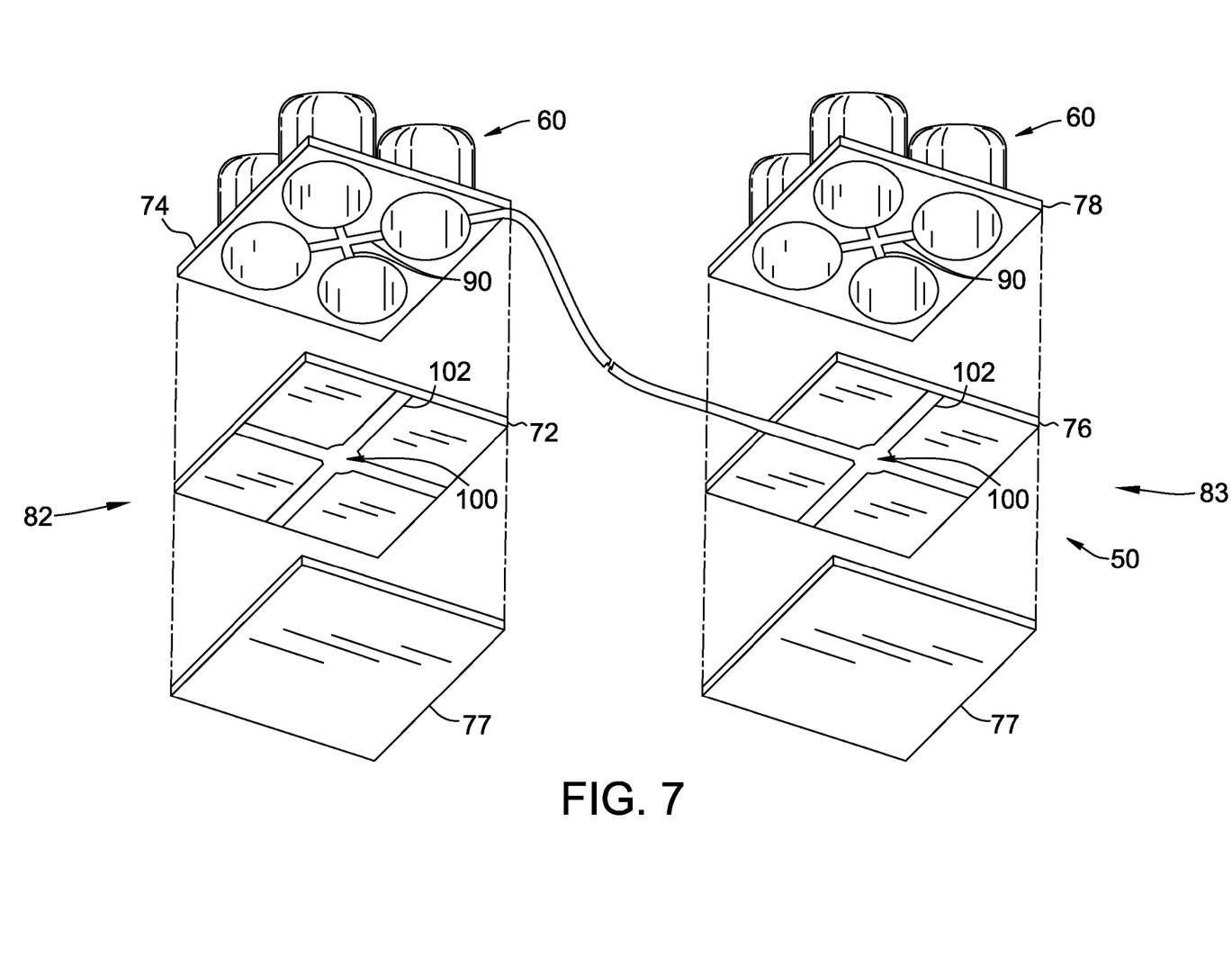
FIG. 7 is a schematic exploded perspective view of an exemplary embodiment of cells of one region of the energy absorption system shown in FIG. 3 in flow communication with a fluid control device of another region of the energy absorption system shown in FIG. 3.

In the exemplary embodiment, at least some cells 60 in impact regions 80 are coupled in flow communication with lock pockets 100 used to control flow with cells 60 in layer 74 and/or 78. For example, in the exemplary embodiment, as illustrated in FIG. 7, at least some cells 60 in side region 82 are coupled in flow communication with lock pockets 100 used to control flow to some cells 60 in layer 78 that are in region 83. Moreover, in the exemplary embodiment, at least some cells 60 in region 83 are coupled in flow communication with lock pockets used to control flow to some cells 60 in layer 78 that are located in region 82. Likewise, cells 60 in region 84 are coupled to lock pockets 100 used to control flow to some cells 60 in layer 78 in the rear region, and cells 60 in the rear region are similarly coupled to lock pockets 100 used to control flow to some cells 60 in layer 78 that are in region 84. In the alternative or in addition, at least some cells 60 extending within layer 74 and/or 78 could be coupled to lock pockets 100 used to control flow to other cells 60 in the same layer 74 and/or 78.

Moreover, in other embodiments, at least some cells 60 in layer 78 could be coupled to lock pockets 100 used to control flow to cells 60 in layer 74. Furthermore, in some embodiments, at least some cells 60 could be coupled to multiple lock pockets 100 used to control flow to cells 60 in either layer 74 and/or layer 78, and/or could be coupled to lock pockets 100 used to control flow to cells 60 located in the same region 80. Any relative orientation of cells 60, lock pockets 100, channels 90 and/or 102, and cell regions 80 may be used that enables system 50 and helmet 10 to function as described herein. In at least some embodiments, at least some cells 60 extending from layer 74 and/or 78 include a support material (not shown) contained therein. More specifically, in the exemplary embodiment, the support material is inserted into specific cells 60 during fabrication of system 50. In such embodiments, the support material is not coupled to any layer 60, but rather is merely contained within each cell 60 and may "float freely" or shift therein.

Moreover, because the support material is not coupled any layer 60, the support material does not affect inflation or deflation of cells 60, but rather facilitates energy dissipation across system 50. The support material can be formed of a variety of materials, including open-celled or closed-celled foam, rubberized material, polyurethane, gels, fluids, and/or combinations of materials, including non-Newtonian fluids. Any support material may be used that is resiliently deformable to some extent and that is capable of flexing and/or deflecting substantially independently of the deflection of cells 60. In some embodiments, the support material may be a gel or fluid that is injected into cells 60. Alternatively, the support material may have any shape that enables system 50 to function as described herein, including for example, a cross-sectional shape that is different than a cross-sectional shape of cells 60. In another embodiment, the support material may be formed into a plurality of pellets that are inserted into cells 60. In a further embodiment, the support material may be formed into a honeycombed shape. Alternatively, any support material, having any shape, including a plurality of different shapes, may be inserted into cells 60, that ensures that system 50 functions as described herein.

In the exemplary embodiment, base 62 also includes at least one inflation/deflation valve (not shown) that extends from base 62. In the exemplary embodiment, each layer 74 and 78 includes an inflation/deflation valve that is coupled in flow communication to lock pockets 100 and cells 60 to enable fluid to be selectively injected into, or discharged from, system 50. More specifically, each inflation/deflation valve enables the fluid pressure within system 50 to be selectively adjusted. In one alternative embodiment, system 50 is a closed system that does not include an inflation/deflation valve. In another alternative embodiment, system 50 includes more than two inflation/deflation valves.

In the exemplary embodiment, the working fluid supplied to system 50 is air. In an alternative embodiment, the working fluid may be any other working fluid that that enables system 50 to function as described herein, including, but not limited to, other gases, fluids, or liquids. It should be noted that the working fluid used in the outer layers 72 and 76, may be different than the working fluid used in the inner layers 74 and 78, and in some embodiments, system 50 may include more than one inflation/deflation valve. For example, in such an embodiment, the radially outer layers 72 and 76 may contain a non-Newtonian fluid or a glycol fluid, while the radially inner layers 74 and 78 may contain air, or vice-versa. The working fluid may be variably selected to facilitate optimizing operation of system 50.

During use, in the exemplary embodiment, system 50 uses air as the working fluid, and initially system 50 is inflated by introducing air through the cell valve(s) into cells 60 and lock pockets 100. In one embodiment, cells 60 extending from layer 74 are initially inflated to a higher pressure than cells 60 extending from layer 78. Cells 60 extending across each respective layer 74 and 78 are pressurized to approximately the same operating pressure across that specific layer 74 or 78, although in some embodiments, cells 60 in layer 74 may be pressurized differently than cells in layer 78. In one embodiment, as each cell 60 is inflated, cells 60 have a generally circular cross-sectional profile. In an alternative embodiment, at least some cells 60 may have a non-circular cross-sectional profile. Moreover, cells 60 extending from layer 74 may have a different cross-sectional profile than cells extending from layer 78. Moreover, cells 60 may have any shape, size, or contour, within either layer 74 and/or 78, including the use of multiple-shaped, sized, and/or contoured cells 60 within the same layer 74 and/or 78 that enables system 50 and helmet 10 to function as described herein.

After the user dons helmet 10, the fluid pressure of cells 60 may be varied based on comfort and/or helmet immersion requirements, and is adjustable by either adding additional air, or by opening at least one inflation/deflation valve to decrease the operating pressure in cells 60. Moreover, changing the fluid pressure of cells 60 may facilitate ensuring helmet 10 conforms to the wearer's head. More specifically, as cells 60 are inflated, in the exemplary embodiment, adjacent cells 60 typically contact each other, such that cells 60 form a generally continuous, and highly displaceable, protective surface that is highly conformable to the wearer and such that cells 60 in layer 74 are positioned substantially in contact against helmet inner surface 18.

It should be noted that when a user dons helmet 10, system 50 substantially conforms to the user's head resulting in a comfortable fit of helmet 50 to the user's head. Moreover, because cells 60 can be fabricated with a relatively low profile, helmet 10 is approximately the same size as, or no larger than, a conventional helmet, without the risk of cells 60 bottoming out during use.

When all of the cells 60 are inflated together, which is normally the case, the sides of adjacent cells 60 generally contact each other and form a generally continuous, energy-absorption system that facilitates reducing the concussive effects of impacts induced to helmet 10. Moreover, in the exemplary embodiment, because system 50 is cellular, system 50 is flexible and resilient under all types of impact loading while providing comfortable protective headgear to the wearer. Furthermore, the cellular design of system 50 enables impact loads 130 induced to helmet 10 to be distributed 132 generally across the entire helmet 10, such that energy resulting from the impact loading is dissipated over a large area.

In the exemplary embodiment, after the fluid pressure within cells 60 is substantially equalized, each cell 60 in each layer 74 and 78 contains approximately the same fluid pressure. Moreover, in the exemplary embodiment, as air is supplied to cells 60, air is also introduced into lock pockets 100 through channels 102. More specifically, as air is introduced into lock pockets 100, the fluid pressure within pockets 100 is increased. Because each pocket 100 is positioned substantially concentrically with respect to channels 90, increasing the pressure within pockets 100 increases an amount of force induced to each adjacent channel 90. More specifically, as force is applied to channels 90, flow communication is stopped between those cells 60 coupled together by those respective channels 90. In the exemplary embodiment, the cells 60 coupled together by channels 90 may be in different regions 80 and may not be immediately adjacent to one another. As such, in the exemplary embodiment, lock pockets 100 may control fluid flow between different impact cell regions 80, as well as between cells 60. Moreover, in the exemplary embodiment, the fluid pressure within lock pockets 100 may not be sufficient to stop flow communication between the cells 90 until a user has donned helmet 10. Accordingly, fluid flow between cells 60 across layers 72 and 76 may be at least partially limited and controlled by lock pockets 100.

During use, when helmet 10 is subjected to an impact force 130, a portion of the energy induced to the helmet 10 is absorbed and distributed by shell 12 and the remaining energy is induced inwardly towards the wearer. Cells 60 that are adjacent to the impact loading 130 induced to the helmet 10, are collapsible in response to the impact. Specifically, each cell 60 is adapted to resist an impact applied to it during the initial phase of the impact, and then each deliberately yields to permit the fluid contained in that cell 60 to distribute 132 the impact loading 130 through a plurality of other cells 60 in the same region and in other regions 80 such that the energy induced to helmet 10 is dissipated. More specifically, as cells 60 are initially collapsed, fluid within cells 60 is initially discharged through channels 90 into other cells 60 within the same region. Fluid is also discharged from cells 60 located in the region 80 immediately adjacent the impact loading 130 into cells in adjacent regions 80 and into lock pockets 100 and cells 60 located in non-adjacent regions 80 of system 50. Lock pockets 100 will limit at least some of the fluid transfer, as described herein.

For example, when an impact 130 is induced to a side of helmet 10, as is shown in FIG. 3, the loading 130 induced to cells 60 in layer 74 is initially distributed 133 to adjacent cells 60 coupled in flow communication to the impacted cells 60 and within region 82. Fluid is then discharged from region 82 into cells 60 in cells 60 in layer 74 in the rear region and in front region 84 and upper region 86. A portion of fluid is also discharged into cells 60 extending from layer 74 in region 83, as well as into lock pockets 100 that control flow into and from cells 60 located in layer 78 and within region 83. Such fluid transfer facilitates dissipating the impact energy 130 induced to helmet 10, through system 50.

In addition, depending on the magnitude of the force 130 induced to helmet 10, cells 60 in layer 78 may also be compressed against the wearer's head. If the impact 130 exceeds a predetermined magnitude, cells 60 in layer 78 will compress and fluid contained therein will be discharged initially into cells 60 within that region 80. Subsequently, fluid will then be discharged into cells 60 in other regions 80 as described above. The orientation and arrangement of lock pockets 100 controls fluid transfer across helmet 10 within layers 74 and 78. For example, depending on the relative placement and orientation of lock pockets 100 and cells 60 within outer layers 72 and 74, relative to lock pockets 100 within inner layers 76 and 78, and depending on the magnitude and location of impact 130 induced to helmet 10, the same or a different number of cells 60 in outer layer 74 may compress, as compared to the number of cells 60 compressing within inner layer 78. In the exemplary embodiment, cells 60 quickly return to their original shape as fluid rapidly refills cells 60 that were initially compressed. As such, after the initial transfer of energy, i.e., fluid discharge, each cell 60 is then ready to accept and to attenuate additional impacts or energy being dissipated from region 83.

The initial inflation of lock pockets 100 in an impact region 80 that is opposite the region 80 initially impacted, facilitates extending the time required to stop the momentum of the wearer's skull by controlling fluid flow from cells 60 in the event that the wearer is subjected to a second impact shortly after the first impact 130 is induced to helmet 50. For example, in the exemplary embodiment described above, depending on the magnitude of the impact 130 initially induced to helmet 50, the wearer may contact another player or the ground in a region 80 opposite the region 82 (in the exemplary embodiment described above) initially impacted. Moreover, depending on the magnitude of the impact 130, the wearer's skull may be forced towards the side of helmet opposite impact 130 (i.e., towards region 83 in the exemplary embodiment). The pressurization of lock pockets 100 facilitates ensuring that cells 60 located in such regions 80 remain temporarily pressurized to enable system 50 to function as described herein. More specifically, in the exemplary embodiment, impact 130 may cause the wearer to fall towards the ground such that helmet 50 contacts the ground along region 83. Moreover, if the wearer's skull is forced towards the helmet along region 83, lock pockets 100 ensure cells 60 are inflated to facilitate extending the time required to stop the momentum of the wearer's skull, and thus facilitates reducing the energy induced by impact 130. Furthermore, inflation of lock pockets 100 in response to the initial impact 130 as system 50 is dissipating the initial impact loading 130, facilitates enhanced flow control from cells 60 and thus facilitates reducing the likelihood of coup contrecoup injuries to the wearer.

During a collision, as is known, an object experiences a force for a given amount of time that results in its mass undergoing a change in velocity. Under the impulse-momentum theorem, force and time are inversely proportional, and as such, to facilitate reducing the effect of the force on the object in the collision, the time should be increased. System 50 enables helmet 10 to facilitate reducing the effects of an impact 130 to the wearer by extending the time required to stop the momentum of the wearer's skull against the helmet 10 and opposite the impact 130.

It should be noted that fluid transfer between the rear region and front region 84 is similar to that described here for transfer between side regions 82 and 83. In the exemplary embodiment, an impact to upper region 86 is dissipated through cells 60 within upper region 86 and then through all of the other impact regions 80. Moreover, in the exemplary embodiment, cells 60 in upper region 86 may also be coupled to lock pockets 100 used to control flow to cells 60 in other impact regions 80. Fluid transfer and venting enables system 50 to manage impact loading and to distribute energy from an impact 130 over a larger area of helmet 10 as opposed to inducing it to the wearer's head. As such loading can be substantially equalized across helmet 10 until the energy is fully dissipated. In the exemplary embodiment, the compressive ability of cells 60, combined with the orientation of cells 60 in layers 74 and 76, enables impact loading induced from helmet shell 10 to be absorbed over at least 80% of the cell height H. The orientation and arrangement of lock pockets 100 ensures at least some cells 60 remain temporarily pressurized and facilitates preventing cells 60 from "bottoming out" when cells 60 are compressed. Furthermore, cells 60 are durable and exhibit consistent impact-absorption even after repeated impacts to helmet 10.

In some embodiments, helmet 10 may include at least one device mounted therein, such as but not limited to a strain gauge and/or a radio frequency identification (RFID) chip, to facilitate measuring an amount of impact induced to helmet 10. System 50 overcomes the limitations of conventional helmet support systems. Specifically, the cellular structure of system 50 overcomes limitations inherent in energy absorption systems that utilize foams or other similar materials and/or structures, and is different from other air systems previously used in energy management systems. Moreover, system 50 is advantageous in that it provides multiple customization options, including, for example, the selection and alteration of the properties of material from which it is fabricated, the thickness of the cell walls, the density of cell material, the geometry of the individual cells, the orientation of the cells relative to each other or between different layers, the fluid viscosity, amount, and volume of fluid in the cells, and/or the size, configuration, relative location, and number of lock pockets, channels, and/or cells. By variably selecting and adjusting these properties, in coordination with each other, system 50 can be customized to facilitate providing a more robust functional range, depending on the particular application to which system 50 is to be used, than has been possible with known system. Furthermore, by variably selecting and coordinating the aforementioned properties, system 50 can be easily tailored to optimize energy absorption from different impact energy levels.

The above-described energy absorption system provides a user with protective headgear that is selectively and dynamically controllable to facilitate increasing stability, comfort, and impact protection to the user. More specifically, each energy absorption system includes at least one conformal layer that includes a plurality of cells extending therefrom, wherein each cell extending from the conformal layer is coupled in flow communication with other cells extending from that conformal layer. Furthermore, each energy absorption system also includes at least one layer that defines a plurality of lock pockets therein that facilitate selectively controlling fluid flow communication between at least some of the cells within the energy absorption system. In addition, the lock pockets facilitate preventing the cells from bottoming out when subjected to an impact, and thus facilitate extending the time required to stop the momentum of the wearer's skull, following an impact to the helmet. Furthermore, the lock pockets facilitate preventing a plurality of cells from deflating, in the event that an individual cell is punctured. As a result, an energy absorption system is provided which facilitates increasing the impact protection provided to a user in a cost-effective and reliable manner.

Exemplary embodiments of impact absorption systems are described above in detail. Although the impact absorption systems are herein described and illustrated in association with a football helmet, it should be understood that the present invention may be used to provide impact protection and/or energy absorption in a plurality of other uses. Moreover, it should also be noted that the components of each energy absorption system are not limited to the specific embodiments described herein, but rather, aspects of each energy absorption system method may be utilized independently and separately from other methods described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A helmet comprising:
    a shell comprising an outer surface and an inner surface; and
    a support system comprising a base and a plurality of hollow cells extending outward from said base, said support system is flexible and substantially conforms to said shell inner surface, said plurality of cells segmented into a plurality of regions wherein said plurality of cells within each of said plurality of regions are coupled together in flow communication via a plurality of channels extending between said plurality of cells, at least one said cells within a first of said plurality of regions is coupled in flow communication to at least one cell within a second of said plurality of regions for selectively transferring fluid from at least some of said cells in said first region to at least some of said cells in said second region to facilitate reducing an amount of energy induced to a wearer of said helmet following an impact to said shell, said support system further comprising a plurality of fluid control devices positioned between said base and at least some of said plurality of cells, each of said plurality of fluid control devices configured to facilitate independently controlling flow communication through at least some of said plurality of channels, wherein a first of said cells within said first region is in flow communication with a first of said plurality of fluid control devices within a third of said plurality of regions, such that fluid discharged from said first cell in response to an impact to said first region causes said first fluid control device to inhibit flow communication between at least some of said cells in said third region.

2. A helmet in accordance with claim 1 wherein said plurality of cells are each fabricated from a material configured to compress when subjected to a pre-defined loading.

3. A helmet in accordance with claim 1 wherein said base comprises at least one layer, said support system further comprises a support material inserted in at least one of said plurality of hollow cells, said base is coupled to said support system such that said support material is between an inner surface of said at least one hollow cell and said base layer.

4. A helmet in accordance with claim 3 wherein said support material facilitates dissipating energy produced following an impact to said shell.

5. A helmet in accordance with claim 3 wherein said support material comprises at least one of a gel, a foam material, a fluid, a non-Newtonian fluid, and a flexible material.

6. A helmet in accordance with claim 3 wherein said support material floats freely within said at least one cell.

7. A helmet in accordance with claim 1 wherein said plurality of cells extend outward from said base between said shell inner surface and said base.

8. A helmet in accordance with claim 1 wherein said base is between said plurality of cells and said shell inner surface.

9. A helmet in accordance with claim 1 wherein said plurality of cells comprise a first plurality of cells that extend from said base outwardly towards said shell inner surface, and a second plurality of cells that extend from said base inwardly away from said shell inner surface.

10. A helmet in accordance with claim 1 wherein at least one of said plurality of cells has a different cross-sectional profile than said remaining plurality of cells.

11. A helmet in accordance with claim 1 wherein said plurality of cells comprise a first plurality of cells extending outwardly from a radially outer surface of said base and a second plurality of cells extending inwardly from a radially inner surface of said base.

12. A helmet in accordance with claim 11 wherein said plurality of fluid control devices are positioned between said base and at least one of said first plurality of cells and said second plurality of cells, each of said plurality of fluid control devices is positioned against at least one of said plurality of channels extending between said plurality of cells, each of said plurality of fluid control devices is configured to be selectively pressurized to facilitate controlling flow communication independently to at least some of said plurality of cells coupled together in flow communication.

13. A helmet in accordance with claim 12 wherein said plurality of fluid control devices facilitate controlling flow communication between at least one cell in said first plurality of regions and at least one cell in said second plurality of regions.

14. A helmet in accordance with claim 12 wherein said plurality of first cells and said plurality of second cells are segmented into a plurality of regions.

15. A helmet in accordance with claim 12 wherein said at least one of said first plurality of cells are one of fabricated from a different material, sized differently, shaped differently, and contain a different fluid therein, than at least one of said second plurality of cells.

16. A helmet comprising:
    a shell comprising an outer surface and an inner surface; and
    a support system comprising a base and a plurality of hollow cells extending outward from said base, said base comprising an outer surface and an inner surface, said support system is flexible and substantially conforms to said shell inner surface, said plurality of cells are segmented into a plurality of regions wherein said plurality of cells within each of said plurality of regions are coupled together in flow communication via a respective plurality of channels extending therebetween, said plurality of cells within at least a first and a second of said plurality of regions extend outward from said base outer surface and are between said shell inner surface and said base outer surface, at least a first cell in said first of said plurality of regions is coupled in flow communication to at least one cell in said second of said plurality of regions for selectively transferring fluid therebetween, said plurality of cells within at least a third of said plurality of regions extend outward from said base inner surface, at least a first of said plurality of cells in said first region is coupled in flow communication with at least one fluid control device positioned adjacent at least some of said plurality of channels between at least some cells in said third region such that fluid discharged from said first cell in response to an impact to said first region causes said at least one fluid control device to inhibit flow communication between said at least some cells in said third region.

17. A helmet in accordance with claim 16 wherein said support system plurality of cell regions facilitates dissipating energy produced following an impact to said shell.

18. A support system for use in dissipating energy induced to a protective structure, said support system comprising:
 a base comprising a first surface and an opposite second surface, said base is flexible;
 a first plurality of hollow cells extending from said base first surface such that said first plurality of cells are each coupled together in flow communication with each other, said first plurality of cells each extend outward from said base first surface; and
 a second plurality of hollow cells extending outward from said base second surface such that said second plurality of cells are coupled together in flow communication with each other via a plurality of channels, said second plurality of cells each extend outward from said base second surface, said first plurality of cells are between said base first surface and the protective structure, at least a first cell of said first plurality of cells is coupled in flow communication to a fluid control device such that fluid discharged from said first cell in response to an impact to said first plurality of cells selectively pressurizes said fluid control device to inhibit flow into and from at least one of said plurality of channels between said cells within said second plurality of cells.

19. A support system in accordance with claim 18 wherein said at least some of first plurality of cells and said second plurality of cells are fabricated from a material configured to compress when subjected to a pre-defined loading.

20. A support system in accordance with claim 19 wherein at least some of first plurality of cells and said second plurality have at least one of a different cross-sectional shape, a different contoured outer surface, and a different size than at least some of said remaining first plurality of cells and said second plurality of cells.

* * * * *